(12) United States Patent
Yang et al.

(10) Patent No.: US 12,120,002 B2
(45) Date of Patent: Oct. 15, 2024

(54) METHOD AND APPARATUS FOR DETECTING ANOMALY OF TRAFFIC OF INTERNET OF THINGS DEVICE BASED ON AUTOMATA

(71) Applicant: Tsinghua University, Beijing (CN)

(72) Inventors: Jiahai Yang, Beijing (CN); Chenxin Duan, Beijing (CN); Zhiliang Wang, Beijing (CN); Hui Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 387 days.

(21) Appl. No.: 17/830,983

(22) Filed: Jun. 2, 2022

(65) Prior Publication Data

US 2022/0303198 A1   Sep. 22, 2022

Related U.S. Application Data

(63) Continuation of application No. PCT/CN2021/105260, filed on Jul. 8, 2021.

(30) Foreign Application Priority Data

Jan. 18, 2021  (CN) .......................... 202110064051.0

(51) Int. Cl.
*H04L 43/02*   (2022.01)
*H04L 43/04*   (2022.01)
*H04L 45/02*   (2022.01)
*H04L 45/48*   (2022.01)

(52) U.S. Cl.
CPC .............. *H04L 43/02* (2013.01); *H04L 43/04* (2013.01); *H04L 45/02* (2013.01); *H04L 45/48* (2013.01)

(58) Field of Classification Search
CPC ......... H04L 43/02; H04L 43/04; H04L 45/02; H04L 45/48; H04L 41/145; H04L 41/06; H04L 63/1425
See application file for complete search history.

(56) References Cited

U.S. PATENT DOCUMENTS

2016/0065482 A1*  3/2016  Curtis .................. H04L 43/026
                                                              709/220
2022/0210056 A1*  6/2022  Agarwal ............. G06F 15/7825

* cited by examiner

*Primary Examiner* — Hashim S Bhatti
(74) *Attorney, Agent, or Firm* — Hodgson Russ LLP

(57) ABSTRACT

A method for detecting a traffic anomaly of Internet of Things (IoT) device based on automata. The method includes: collecting normal traffic of an IoT device to be monitored in each working state, and deriving normal traffic traces; generating flow trees by assembling each flow in the normal traffic traces, and generating joint flow trees by merging the flow trees; and converting a data structure representing the flow in the joint flow trees into automata models after performing reduction processing on the flow in the joint flow trees.

11 Claims, 4 Drawing Sheets

METHOD AND APPARATUS FOR DETECTING ANOMALY OF TRAFFIC OF INTERNET OF THINGS DEVICE BASED ON AUTOMATA

CROSS-REFERENCE TO RELATED APPLICATIONS

The present application is a continuation of International Application No. PCT/CN2021/105260, filed on Jul. 8, 2021, which is based upon and claims priority to Chinese Patent Application No. 202110064051.0, filed on Jan. 18, 2021, the entire contents of which are incorporated herein by reference.

FIELD

The present disclosure relates to the technical field of the Internet of Things, and in particular to a method and an apparatus for detecting a traffic anomaly of Internet of Things (IoT) device based on automata.

BACKGROUND

At present, with the rapid development of IoT technology, various types of IoT devices have been deployed in large numbers in various fields of human production and life, such as smart homes, smart cities, and industrial control systems. While bringing great convenience, IoT devices are also facing various network security threats. On the one hand, IoT devices may not work properly due to malicious attackers' intrusions and form large-scale botnets, which can be used to launch large-scale distributed denial-of-service attacks and harm important communication infrastructure. On the other hand, as the use of IoT devices is closely related to human production and living activities, its own improper behavior, such as failures or malfunctions, will also endanger the safety and privacy of users. Therefore, there is a great demand for algorithms and systems that can monitor the communication behavior and working status of various IoT devices and further detect anomalies.

SUMMARY

Embodiments of the present disclosure propose a method for detecting a traffic anomaly of Internet of Things (IoT) device based on automata. The method includes: collecting normal traffic of an IoT device to be monitored in each working state, and deriving normal traffic traces; generating flow trees by assembling each flow in the normal traffic traces, and generating joint flow trees by merging the flow trees; and converting a data structure representing the flow in the joint flow trees into automata models after performing reduction processing on the flow in the joint flow trees.

Embodiments of the present disclosure propose an apparatus for detecting a traffic anomaly of Internet of Things (IoT) device based on automata. The apparatus includes: a processor, a memory storing instructions executable by processor, in which the processor is configured to: collect normal traffic of an IoT device to be monitored in each working state, and generate normal traffic traces; generate flow trees by assembling each flow in the normal traffic traces, and generate joint flow trees by merging the flow trees; and convert a data structure representing the flow in the joint flow trees into automata models after performing reduction processing on the flow in the joint flow trees.

Embodiments of the present disclosure propose a non-transitory computer-readable storage medium, having instructions stored thereon, in which when the instructions are executed by a processor, the processor is caused to implement a method for detecting a traffic anomaly of Internet of Things (IoT) device based on automata. The method includes: collecting normal traffic of an IoT device to be monitored in each working state, and deriving normal traffic traces; generating flow trees by assembling each flow in the normal traffic traces, and generating joint flow trees by merging the flow trees; and converting a data structure representing the flow in the joint flow trees into automata models after performing reduction processing on the flow in the joint flow trees.

DESCRIPTION OF DRAWINGS

The above and/or additional aspects and advantages of the present disclosure will become obvious and easy to understand from the following description of the embodiments in conjunction with the accompanying drawings, in which.

DETAILED DESCRIPTION

A method and an apparatus for detecting a traffic anomaly of Internet of Things (IoT) device based on automata provided by embodiments of the present disclosure will be described in detail below with reference to the accompanying drawings.

In the related arts, designing an anomaly detection system suitable for IoT devices usually faces the following challenges. First, IoT devices used in different fields use a variety of different communication technologies and network scales, designing algorithms for different techniques requires a lot of expert knowledge, and the designed algorithms are not universal. Secondly, IoT devices usually have constrained communication and computing resources, so the accompanying anomaly detection system should not incur high overhead, and its operation cannot hinder the normal operation of IoT devices. Third, the security threats and attack vectors faced by IoT devices are also very extensive. In addition to intrusions from malicious attackers, misbehaviors such as device malfunctions need to be detected in time. Therefore, the detection target of an intrusion detection system should not be limited to a specific type of anomalies. Finally, the IoT technology is still undergoing rapid development, and new device types, vulnerabilities, and attack vectors will continue to appear.

Figure 1:
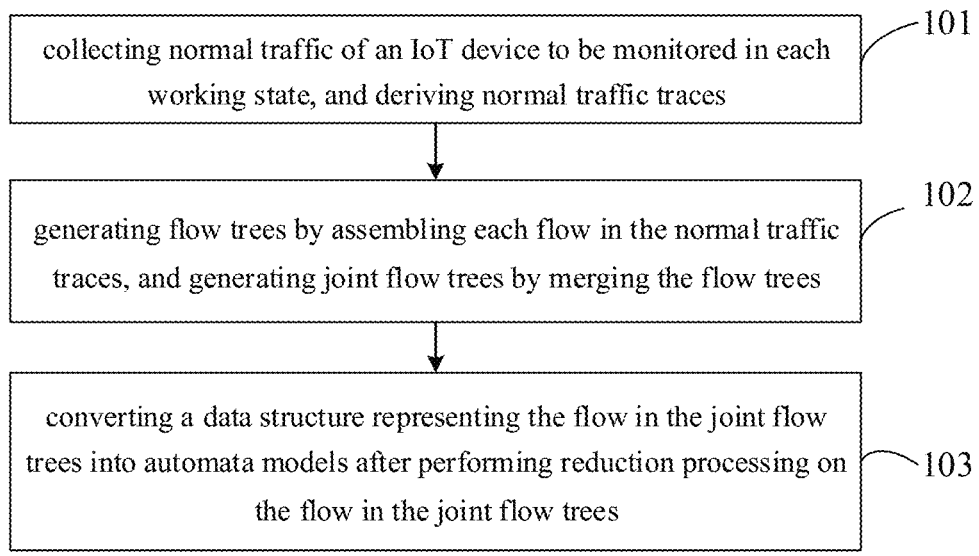
FIG. 1 is a schematic flowchart of a method for detecting a traffic anomaly of Internet of Things (IoT) device based on automata of an embodiment of the present disclosure.

Referring to FIG. 1, FIG. 1 is a schematic flowchart of a method for detecting a traffic anomaly of Internet of Things (IoT) device based on automata of an embodiment of the present disclosure.

As shown in FIG. 1, the method includes but not limited to the following steps:
   step 101, collecting normal traffic of an IoT device to be monitored in each working state, and deriving normal traffic traces;
   step 102, generating flow trees by assembling each flow in the normal traffic traces, and generating joint flow trees by merging the flow trees;
   step 103, converting a data structure representing the flow in the joint flow trees into automata models after performing reduction processing on the flow in the joint flow trees.

In a possible implementation, it should be noted that, only length and direction of a packet in a flow will be concerned, and packets with the same length and direction will be regarded as the same packet. These two attributes are inherent characteristics in the communication packets, which is unrelated to communication technology, and makes the system communicative. Therefore, in the following description, the similarities and differences of packets are only dealt with in terms of the length and direction of the packets.

It is necessary to collect the normal traffic of the IoT device to be monitored in the environment to be deployed, which is used for model construction in a training stage, and a training data set will be used for constructing a profile of the normal behavior of the IoT device. Therefore, the present disclosure needs to cover as much as possible the working status of the IoT device that may be used and triggered when collecting the training data set, which will help to reduce the potential false alarms of the system.

In a possible implementation, given normal traffic traces of an IoT device, the present disclosure first assembles the packets into a communication flow with a common communication context. Generally, no matter what kind of communication technology, a communication flow can be determined by a triple, that is, identifiers (addresses) of the communicating parties and the protocol or channel used in the communication. This c identifier is used very common in machine-to-machine (M2M) communication. Under special circumstances, the communication object in some communication technologies may need to be determined by multiple identifiers, but the determination method can still be adapted to the triple flow identifier, for example, the direct communication objects in the Internet TCP/IP protocol stack are two processes running on two endpoints, so it is necessary to use the IP (Internet Protocol) address and the port number to identify a communication object, then the communication identifier of the triplet can be adapted to a 5-tuple, That is, each communication object is determined by the 2-tuple of IP address and port number.

If there is no packet being transmitted for two consecutive seconds in a sequence of packets with a specific identifier, the flow is judged to end, and when a packet with the same flow identifier appears again, it is regarded as a beginning of a new flow. This method of determining the start and end of a communication flow is also not limited to any communication technology.

Generating the flow trees by assembling each communication data flow (referred as flow in followings) in the normal traffic traces includes: obtaining an identifier of the flow, and marking the identifier of the flow at a root node of a flow tree; obtaining a 2-tuple of length and direction of a communication packet in the flow, and marking the 2-tuple at a non-root node of the flow tree; and marking an occurrence number of two consecutive packets in a same context on an edge of the flow tree, and combining same prefix sequences in the flow into a same node representation, so as to generate the flow trees.

Figure 2:
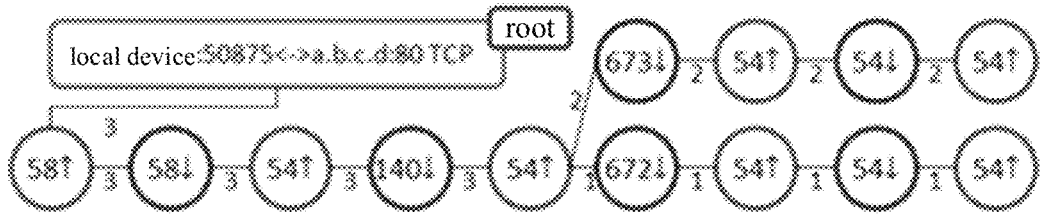
FIG. 2 is a schematic diagram of a flow tree according to an embodiment of the present disclosure.

Specifically, in order to identify the assembled communication flow, the present disclosure introduces a data structure called a flow tree. In the flow tree, the root node of the tree is marked with the identifier of the communication flow, and the non-root node represents a 2-tuple of the length and direction of a communication packet. A path from the root node of the flow tree to the leaf nodes represents a sequence of packets arranged in chronological order in the communication flow. On the edge of the flow tree, the number of occurrences of two consecutive packets in the same context is labelled. Due to the characteristics of the tree structure, the same prefix sequence in the communication flow will be merged into the same node representation. As shown in FIG. 2, FIG. 2 is a schematic diagram of a flow tree. The numbers in the 2-tuple in FIG. 2 indicate the length of the packet in bytes, the symbol ↑ indicates a direction that the packet is sent by the IoT device, the symbol ↓ indicates a direction of receiving by the IoT device.

In a possible implementation, a similarity measure between different flow trees may be calculated, and the joint flow trees are generated by merging two flow trees corresponding to a similarity metric value smaller than a preset threshold.

Specifically, there are similar communication patterns among the communication flows to be assembled into a flow tree, and they can be further synthesized into the same representation structure. Based on the labels on the edges of the flow tree, the number and proportion of various nodes in a flow tree can be calculated. The present disclosure regards a packet on a flow tree as a discrete random variable, and calculates its probability distribution by means of frequency estimation probability, and calculates the similarity measure between different flow trees based on Hellinger distance. The definition of Hellinger distance is defined as follows:

$$H(P, Q) = \sqrt{\frac{1}{\sqrt{2}} \sum_{i=1}^{k} (\sqrt{p_i} - \sqrt{q_i})^2} = \frac{1}{\sqrt{2}} \|\sqrt{P} - \sqrt{Q}\|_2.$$

Figure 3:
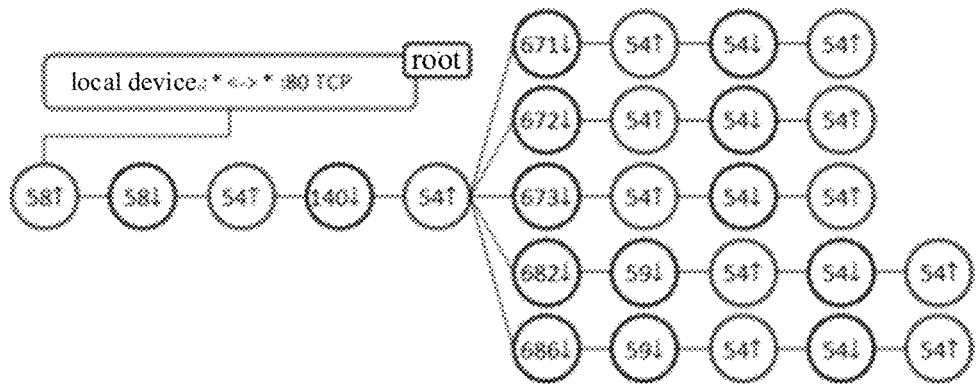
FIG. 3 is a schematic diagram of joint flow trees according to an embodiment of the present disclosure.

If a distance measure between two flow trees is smaller than a certain threshold, they will be merged. The merged data structure has the same structure as the flow tree, so it can continue to be merged with other flow trees. This process is terminated when the distance measure between all flow trees is greater than the threshold. The flow identifiers on the root node of the joint flow trees will also be aggregated. For the value of the flow identifier in the same field, if the values of the fields in all the merged original flow trees are the same, the field corresponding to the root node in the joint flow trees is still filled with this value, otherwise a wildcard (*) is used to fill the corresponding field, which means that the flow tree has no special restriction on this field in the flow identifier. As shown in FIG. 3, it is joint flow trees that contains the flow tree in FIG. 2.

In a possible implementation, the flow tree can effectively represent the communication flow of the IoT devices with a short duration. For a long flow containing thousands of packets, the height of the flow tree will approach the number of packets in the flow, and there is few packet can be aggregated into nodes with the same prefix node. Therefore, in the present disclosure, long flows are defined as consisting of more than 50 packets exchanged, and further processing is performed on them. After fully observing different IoT devices, the long flow existing in the communication of the IoT device can be divided into two categories. The two different kinds of long flow will be defined separately and the corresponding processing flow will be introduced below.

Performing the reduction processing on the flow in the joint flow trees includes: obtaining a first class of flow tree with a node packet ratio exceeding a preset threshold from the joint flow trees; in which, the node packet ratio of each flow tree is calculated by dividing a number of nodes in the joint flow trees by a number of packets with different tuples of length and direction represented by each node; and converting the first class of flow tree into a packet sequence diagram; in which, in the packet sequence diagram, a root node of the first class of flow tree and a flow identifier in a node are reserved, packets with a same tuple of length and direction are represented by a same node, and a directed edge is added between every pair of nodes corresponding to two consecutive packets.

Specifically, the first kind of long flow refers to long flows that only consist of a few different packets although the number of exchanged packets in them can be very large. Generally, there are usually no more than 50 different packet length and direction 2-tuples. This kind of long flows are usually generated by intensive interactions between users and the devices using several commands. For example, the user can adjust the brightness or color of a bulb frequently in a short time so that a few limited short communication patterns are arranged in a different order to form the first kind of long flow. In addition to the first kind of long flow that appears directly in the training data set, the communication modes embodied in some joint flow trees may also be called the potential first kind of long flow, that is, the device supports frequent operations by the users functionally through simple commands, but such operations are not triggered by the user during the collection of traffic. In order to enhance the robustness and generalization ability of the model, the potential first kind of long flow also needs further processing. In order to discover the potential first kind of long flow, the present disclosure defines an index called the node packet ratio. The node packet ratio is defined as a value calculated by taking the number of its nodes divided by the number of different packets in the flows it represents. Large ratio means that a lot of the same packets are represented by different nodes in a flow tree due to their different contexts, that is, it may be caused by the communication mode generated by the same command under the different operation sequence of the user, so it can become the potential first kind of long flow. For a flow tree whose node packet ratio exceeds a certain threshold, it will be subjected to a special processing for the first kind of long flow like an explicit long flow tree whose height exceeds a certain threshold.

Figure 4:
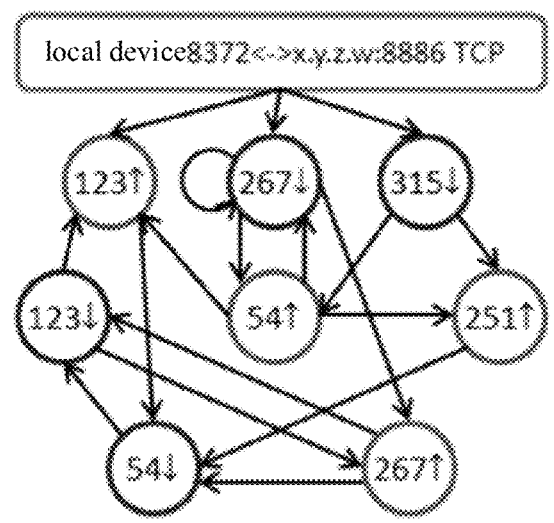
FIG. 4 is a schematic diagram of a packet sequence diagram according to an embodiment of the present disclosure.

Specifically, in order to represent the first kind of long flow in a data structure with lower complexity, the present disclosure transforms the flow tree into a data structure called a packet sequence diagram. In the packet sequence diagram, the root node of the flow tree and the flow identifier in the node are reserved, and all packets with the same tuple of length and direction are represented by the same node, and a directed edge is added between every pair of the nodes corresponding to any two consecutive packets in the packet sequence which is arranged in time sequence in the flow, that is, the packets corresponding to the two nodes that have a parent-child relationship in the flow tree maintain the edge connecting each other in the packet sequence diagram, which indicates that there is a continuous transmission relationship between these two packets. The number of nodes in this data structure is limited by the number of packets with different tuples in the first kind of long flow, so it will not have a high degree of complexity. On the other hand, for each packet in the packet sequence diagram, only the context of the previous packet is limited, and the robustness of the model is also enhanced. As shown in FIG. 4, it is a schematic diagram of a packet sequence diagram.

In a possible implementation, performing the reduction processing on the flow in the joint flow trees includes: obtaining, from the joint flow trees, a second class of flow tree that a number of packets with different tuples of length and direction is greater than a preset threshold; determining a packet with a proportion of packets with different tuples of length and direction being greater than a preset threshold as a beacon packet, representing the beacon packet by a single vertex in the packet sequence graph, determining a context of another node according to a beacon packet that is closest to the node in a packet sequence, aggregating packets with a same direction but different lengths into a same kind of packets and representing the same kind of packets by a node that represents a packet collection with a certain length within a certain range and a specific direction, and organizing the joint flow trees into a packet sequence diagram.

Figure 5:
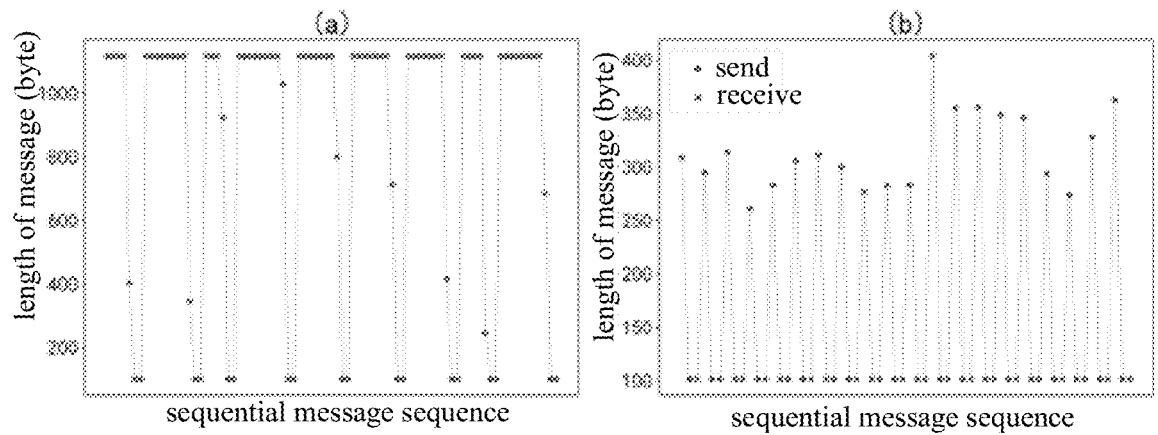
FIG. 5 is a schematic diagram of a second kind of long flow in a certain camera device according to an embodiment of the present disclosure.

Specifically, the characteristic of the second kind of long flow is that, in a continuous communication flow, not only the number of transmitted packets is large, but the packets with tuples of different length and direction are also relatively large, usually exceeding 1000, which is close to the value of the maximum transmission units of the communication channel. The second kind of long flow also has more typical causes, so that it still shows a certain pattern, and the complexity of the model can be reduced through further processing. The second kind of long flow usually receives or sends large amounts of real-time data as IoT device's need, for example, monitoring cameras continuously outputs video signals and multimedia devices downloads audio and video files from content providers. In these communication flows, the amount of data that the device intends to transmit is large. However, due to the limitation of the network transmission capacity, these large amounts of data must be divided into a sequence of packets with a length not greater than the maximum transmission unit of the network for transmission. In most cases, the original size of the data will not be divided into a certain number of packets with a length equal to the maximum transmission unit of the network. At the same time, in order to make full use of the network bandwidth and improve transmission efficiency, the fragmented packet sequence is usually a series of a packet with a length equal to the maximum transmission unit of the network and a following packet with a relatively random length which is less than the maximum transmission unit of the network, which is the last packet causing an increase of the number of packets with different tuples of length and direction in the entire second kind of long flow. However, precisely because of its generation mechanism, these packets with relatively random lengths have similar contexts, and therefore can be integrated into a unified simple structure to represent. As shown in FIG. 5, FIG. 5 shows the packet length and direction change curves of the packet sequence fragments of a certain camera device when the monitoring screen is focused and unfocused, which are all typical second kind of long flows.

Figure 6:
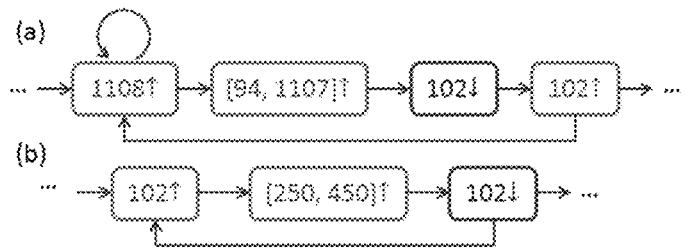
FIG. 6 is a partial packet sequence diagram of the second kind of long flow segment in FIG. 5 according to an embodiment of the present disclosure.

Specifically, based on the characteristics of the second kind of long flows, the present disclosure calculates the number of packets with tuples of different lengths and directions according to the flow tree representing them, and a packet with a proportion exceeding a certain threshold (adjustable hyperparameters, experiments show that 0.1% may be a reasonable value) is regarded as a beacon packet in the present disclosure, and represents the packet with these tuples by a single vertex. For other nodes, the context is determined according to the nearest beacon packet in the packet sequence. For packets with the same direction and context but different lengths, they are aggregated into the same kind of packet, the same kind of packets may be represented by a node that represents a packet collection with a certain length within a certain range and a specific direction. After that, these nodes are organized into a packet sequence diagram according to the steps similar to the processing method of the first kind of long flow. Since a large number of relatively random packets are aggregated into similar packets represented by the same node, the present disclosure can represent the second kind of long flow with a packet sequence diagram with limited complexity. FIG. 6 is a partial packet sequence diagram of the second kind of long flow segment in FIG. 5.

Therefore, after the above processing, the present disclosure completes the communication flow mode that may be generated by the IoT device with some data structures that are not too complicated.

Figure 7:
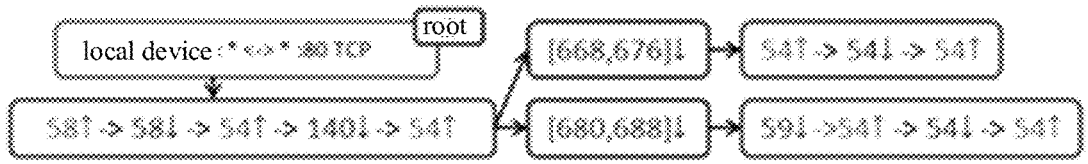
FIG. 7 is a schematic structural diagram of the flow tree in FIG. 3 after merging nodes according to an embodiment of the present disclosure.

Specifically, in the process of representing various communication flow patterns as specific data structures, the present disclosure mainly considers the similarity between different flows, and has not yet processed some patterns in the flow. These processing will make some of the nodes in the data structure to be further merged to reduce complexity and increase model robustness. Within the data structure, the present disclosure mainly considers two kinds of situations where nodes can be merged. The first category refers to a path without any forks formed by a series of packets in the data structure. The connection relationship between these nodes is single, so they can be aggregated into the same node to directly represent a sequence. The other kinds refers to the fact that after many child nodes of a node have forked, the child nodes after different forks all have the same direction and very close length, and their contexts are also very similar. For this kind of bifurcation node, it can be aggregated to represent nodes with a specific direction and a continuous length range. After the aggregation, the same successor sequence can also be further merged. As shown in FIG. 7, it is the structure of the flow tree in FIG. 3 after further node merging.

In a possible implementation, converting the data structure representing the flow in the joint flow trees into the automata models includes: converting all nodes in the joint flow trees into a state set, in which a node marked with a flow identifier is an initial state of the automata model, and packet tuples in different forms on the node forms a symbol set of the automata; for every two nodes connected by a directed edge in an original data structure, adding a state transition relationship between a state corresponding to a predecessor node and a state corresponding to a symbol of a successor node mapped to the successor node to a state transition function; and forming an acceptance state set of the automata models by labeling a state corresponding to the last packet appearing in the original flow as an acceptance state.

Specifically, in the first few steps of the training stage of the present disclosure, various communication flows generated by IoT devices have been expressed as various fully optimized data structures with reasonable complexity. At the end of the training phase, the present disclosure converts these data structures into an automata model. In the present disclosure, the flow model of each IoT device is represented by a set of automata. First, the definition of automata in the present disclosure is given. Generally, the automata models in the present disclosure can be represented by a 5-tuple: $<Q; S; d; q0; F>$; where Q is a finite set of states, and S is a finite set of symbols with a length of the packet and a sequence 2-tuple as a basic form. A symbol can have the following three forms, a tuple (l,d) with a specific length and direction; a sequence of ordered packets with a specific length and direction $\{(l, d)\}$; a tuple set ([la, lb], d) representing a packet with a specific direction and a length in a continuous range, where d is a state transition function, that is, d: $Q \times S \rightarrow Q$, q0 satisfies $q0 \in Q$, which is an initial state of the automata and represents the state of the automata when it does not accept any input symbols. At the same time, the initial state also limits the flow identifier that can drive the communication flow of the automata, F is a subset of Q, which represents a set of acceptance states.

Figure 8:
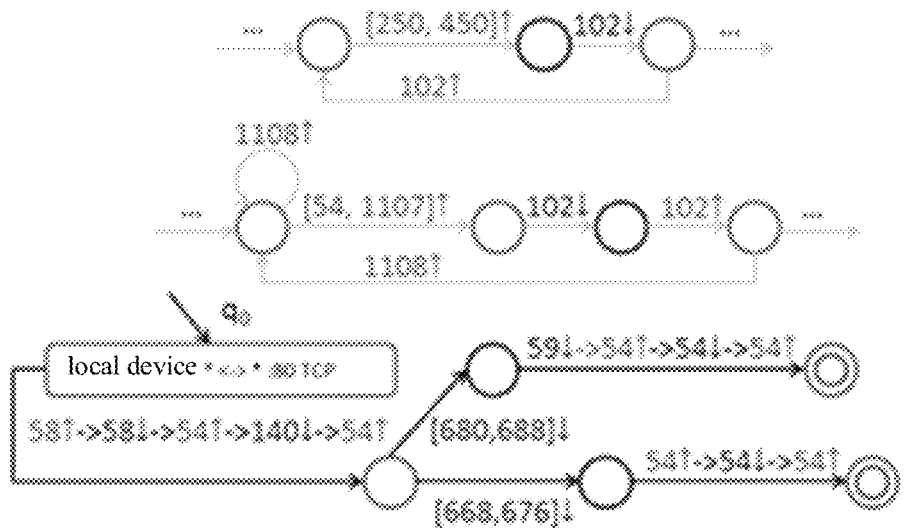
FIG. 8 is a schematic diagram of automata according to an embodiment of the present disclosure.

Specifically, the various data structures described above can all be converted into automata models through the same process. First, all nodes are transformed into a state set. The node marked with a flow identifier is the initial state of the automata, and the packet tuples of different forms on the node constitute the symbol set of the automata. For every two nodes connected by a directed edge in the original data structure, the transition relationship between the state corresponding to the predecessor node and the symbol of the successor node mapping to the state corresponding to the successor node is added to the state transition function. All the states corresponding to the last packet appearing in the original communication flow are marked as acceptance states, and they constitute the set of receiving states of the automata. FIG. 8 (double-edge state represents the acceptance state) shows several automata converted from the data structure used as an example in the previous description. Therefore, a model covering all packet transfer modes in the input traffic data set is established.

Based on the above-mentioned embodiment, based on the automata models constructed in the training phase, the present disclosure can be used for real-time monitoring of the traffic of IoT devices and detecting various anomalies.

In the embodiment of the present disclosure, after the automata models are obtained, the method also includes: obtaining a traffic to be detected of the IoT device; and determining that the flow to be detected is abnormal in response to no automata model matching to the flow to be detected.

Specifically, the present disclosure first uses the traffic model constructed in the training phase as the profile of the normal communication behavior of the Internet of Things devices, and reports the traffic that deviates from this profile as an anomaly caused by a potential intrusion behavior. Given a communication flow generated by a device, the present disclosure first tries to find an automaton that can match the flow identifier of the flow according to the initial state in the automata set of the device. If it cannot be found, then the flow is directly judged to be abnormal, which may be caused by the attacker's service detection and scanning. For a flow that finds an acceptable automata, the tuple of real-time packets in the flow is used as the input symbol to drive the transfer of the automata. If eventually with the end of the flow, there is an automaton that terminates in a certain accepting state, the flow is regarded as normal, otherwise it is regarded as abnormal.

In order to increase the robustness of the model and prevent too many false positives, when an ongoing flow cannot continue state transition, the present disclosure may try to skip the state, force matching and transiting to a transferable state to perform error recovery. In order to balance false positives and false negatives, the frequency of use of this error recovery is limited. Generally, every 20 packets that have normally undergone a state transition can allow error recovery of one packet. This kind of processing enables the present disclosure to deal with network jitter such as packet loss, retransmission, and disorder without causing false alarms. At the same time, it also limits the morning and afternoon of each packet in the communication flow, and has sufficient ability for anomaly detection.

Specifically, for a communication flow that is reported as abnormal, the present disclosure can give both the status of its acceptance by the automata and how many packets have normally completed the state transition before it is determined to be abnormal. This information will help managing personnel to analyze, verify and respond to the abnormal alarms generated.

In a possible implementation, after the automata models are obtained, the method also includes: generating a corresponding abstract event in response to receiving the flow by the IoT device; and determining that the flow is abnormal in response to absence of two successive abstract events in the normal traffic traces.

Specifically, in many scenarios, different IoT devices have a cooperative relationship with each other, such as conditional triggering and action generation rules between sensors and actuators. Based on the mapping relationship between the traffic pattern of the Internet of Things device and the device state, the present disclosure can also detect whether an event that occurs on the Internet of Things device has context-related anomalies. For each communication flow accepted by the automata model, the present disclosure will generate an abstract event corresponding to the device, indicating that a certain action or event has occurred and the device state has changed. The present disclosure uses the sequential relationship of these abstract events in the training data set as a benchmark to perform context-sensitive anomaly detection. Since the input training data of the present disclosure does not explicitly state the context rules existing in the current environment, the present disclosure only checks whether two consecutively generated abstract events have appeared in the training data set, and if they do not appear, it is regarded as abnormal. This is a very simple detection logic. In fact, this detection logic can be artificially set based on the management personnel's understanding of the working logic of the IoT devices in the environment and expert knowledge, and the abstract events generated by the system can be labeled with actual meanings, which enhances the ability of the present disclosure to detect such anomalies, and this is a more encouraging way of use.

In the embodiment of the present disclosure, an alarm packet is sent in response to determining an anomaly.

Specifically, it is difficult for an anomaly detection system to guarantee perfect performance without any errors. In actual scenarios, the configuration and operating environment of the device may change, which requires that the anomaly detection system is easy to expand, can follow up changes in time, and learn from feedback from managers to avoid repeating the same mistakes. The present disclosure can better meet the needs in this regard. On the one hand, whenever the device or operating environment changes, managers can provide a new flow data set to enable the system to rebuild the model. This process is efficient and does not cause significant overhead. On the other hand, since the model constructed in the present disclosure has a What You See Is What You Get characteristic, managers can directly interact with the model to optimize the model based on their own expert knowledge. This interaction can also be achieved through graphical users. The interface is easier to implement.

Figure 9:
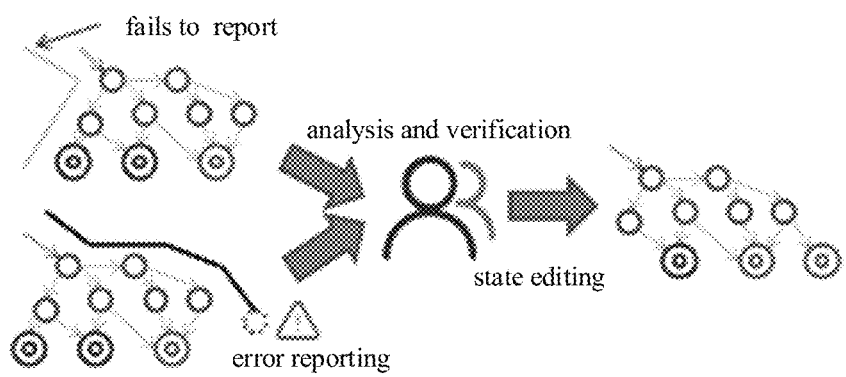
FIG. 9 is a diagram illustrating lifetime feedback learning and optimization through model editing according to an embodiment of the present disclosure.

FIG. 9 is a diagram illustrating lifetime feedback learning and optimization through model editing. For the alarms generated by the system, the management personnel found the false alarms and false alarms in the system through analysis and verification, and used the information provided by the system to locate the causes of the false alarms and false alarms. Then managers can edit the model by adding and deleting states, changing symbols, adding transfer relationships, etc., so that the model can learn feedback from managers in a timely manner. When traffic with the same pattern appears again, and error reporting and underreporting may not occur repeatedly. With the continuous maintenance and optimization of the system, the detection performance of the system will get better and better.

Figure 10:
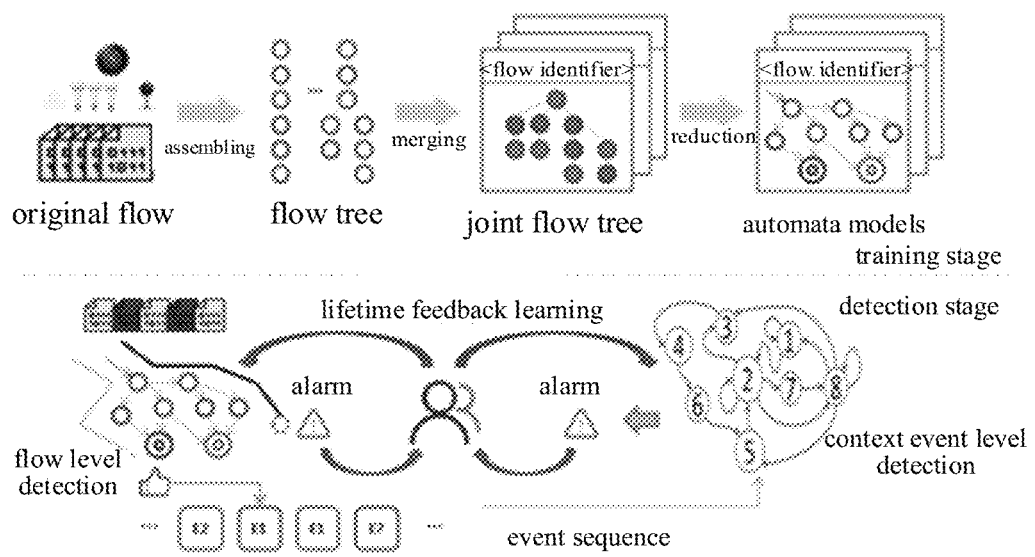
FIG. 10 is a schematic diagram of an IoT device identification method based on semi-supervised learning according to an embodiment of the present disclosure.

Based on the description of the foregoing embodiment, as shown in FIG. 10, the workflow of the present disclosure is divided into two phases, a training phase and a detection phase. In the training phase, the system takes the raw traffic of various IoT devices as input, and builds a model describing the normal behavior of the device from it. In the detection phase, the model constructed in the previous phase of the system is used as a benchmark to monitor the real-time traffic generated by the Internet of Things devices in the network and detect abnormal traffic. The alarms given by the system are analyzed and verified by the management personnel, and the feedback can be updated to the model established by the system through direct interaction in time, so as to realize the lifelong learning and optimization of the system.

The present disclosure aims at establishing a model that accurately described its normal communication behavior profiles based on normal flow set generated by the IoT device, and using the model for device behavior monitoring and anomaly detection.

Specifically, the present disclosure has performed performance evaluation in a real IoT environment, and the IoT devices used in the evaluation cover different communication technologies (WiFi/Zigbee) and functions (sensors, household appliances, surveillance cameras, etc.). Experimental results show that the present disclosure can accurately detect various types of abnormal phenomena, including the intrusion behavior of malicious attackers and contextual anomalies caused by the failure of the device itself, and there is almost no underreporting. At the same time, the false alarm rate of the present disclosure can also be maintained at a very low level, and the false alarm rate will continue to decline under continuous maintenance and optimization. The anomaly detection system of the present application will continue to evolve with changes, has good scalability, can optimize itself from the feedback of managers in time, avoid repeating the same mistakes, that is, realize lifetime anomaly detection.

Specifically, the present disclosure is applicable to typical IoT devices with only a specific single function, and most IoT devices in daily life and production meet this requirement. However, some networked devices called "Internet of Things" devices are not within the scope of disclosure of the present disclosure. Typical Internet of Things devices include smart game terminals and smart TVs. Although IoT-like devices are not typical general-purpose networking devices, such as personal computers, smart phones, and servers, they also have the ability to load and run a variety of configurable programs or services from third parties, so their communication capabilities are close to Universal networking device, and the communication mode does not have the simplicity and stability of a single-function IoT device. The method design of the present disclosure is based on the fact that the flow pattern of the Internet of Things devices is relatively single and will be periodically repeated. Therefore, some types of Internet of Things devices are not within the scope of disclosure of the present disclosure.

With the method provided in embodiments of the present disclosure, normal traffic traces are generated by collecting normal traffic of an IoT device to be monitored in each working state, flow trees are generated by assembling each flow in the normal traffic traces, and joint flow trees are generated by merging the flow trees, and a data structure representing the flow in the joint flow trees is converted into automata models after performing reduction processing on the flow in the joint flow trees. As a result, automata models that can accurately describe the profile of normal communication behavior is established based on the normal traffic set generated by IoT devices, and the automata models are used for device behavior monitoring and anomaly detection, so that various types of abnormal phenomena can be detected accurately, and accuracy and efficiency of anomaly detection for IoT devices can be improved.

Embodiments of the present disclosure also propose apparatus for detecting a traffic anomaly of Internet of Things (IoT) device based on automata.

Figure 11:
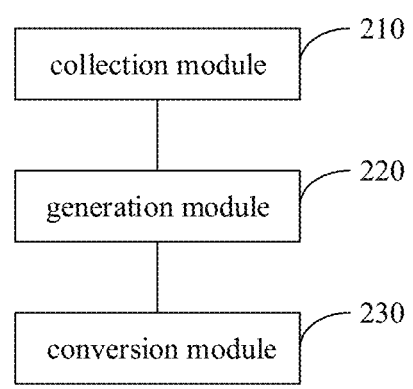
FIG. 11 is a schematic structural diagram of an apparatus for detecting a traffic anomaly of Internet of Things (IoT) device based on automata of an embodiment of the present disclosure.

FIG. 11 is a schematic structural diagram of an apparatus for detecting a traffic anomaly of Internet of Things (IoT) device based on automata of an embodiment of the present disclosure.

As shown in FIG. 11, the apparatus includes: a collection module 210, a generation module 220, and a conversion module 230.

The collection module 210 is configured to collect normal traffic of an IoT device to be monitored in each working state, and generate normal traffic traces.

The generation module 220 is configured to generate flow trees by assembling each flow in the normal traffic traces, and generate joint flow trees by merging the flow trees.

The conversion module 230 is configured to convert a data structure representing the flow in the joint flow trees into automata models after performing reduction processing on the flow in the joint flow trees.

With the apparatus provided in embodiments of the present disclosure, normal traffic traces are generated by collecting normal traffic of an IoT device to be monitored in each working state, flow trees are generated by assembling each flow in the normal traffic traces, and joint flow trees are generated by merging the flow trees, and a data structure representing the flow in the joint flow trees is converted into automata models after performing reduction processing on the flow in the joint flow trees. As a result, automata models that can accurately describe the profile of normal communication behavior is established based on the normal traffic set generated by IoT devices, and the automata models are used for device behavior monitoring and anomaly detection, so that various types of abnormal phenomena can be detected accurately, and accuracy and efficiency of anomaly detection for IoT devices can be improved.

In a possible implementation, the structure of the apparatus also includes: an obtaining module, configured to obtain a traffic to be detected of the IoT device; and a first detection module, configured to determine that the flow to be detected is abnormal in response to no automata model matching to the flow to be detected.

In a possible implementation, the structure of the apparatus also includes: an acceptance generation module, configured to generate a corresponding abstract event in response to receiving the flow by the IoT device; and a second detection module, configured to determine that the flow is abnormal in response to absence of two successive abstract events in the normal traffic traces.

In a possible implementation, the structure of the apparatus also includes: a sending module, configured to send an alarm packet in response to determining an anomaly.

It should be noted that the foregoing explanation of the embodiment of the method for detecting a traffic anomaly of IoT device based on automata is also applicable to the apparatus for detecting a traffic anomaly of IoT device based on automata of this embodiment, and will not be repeated here.

In the foregoing embodiments, it may be implemented in whole or in part by software, hardware, firmware, or any combination thereof. When implemented by software, it can be implemented in the form of a computer program product in whole or in part. The computer program product includes one or more computer programs. When the computer program is loaded and executed on the computer, the process or function according to the embodiment of the present application is generated in whole or in part. The computer may be a general-purpose computer, a special-purpose computer, a computer network, or other programmable devices. The computer program may be stored in a computer-readable storage medium, or transmitted from one computer-readable storage medium to another computer-readable storage medium. For example, the computer program may be downloaded from a website, computer, server, or data center. Transmission to another website, computer, server or data center via wired (such as coaxial cable, optical fiber, digital subscriber line (DSL)) or wireless (such as infrared, wireless, microwave, etc.). The computer-readable storage medium may be any available medium that can be accessed by a computer or a data storage device such as a server or a data center integrated with one or more available media. The usable medium may be a magnetic medium (for example, a floppy disk, a hard disk, a magnetic tape), an optical medium (for example, a high-density digital video disc (digital video disc, DVD)), or a semiconductor medium (for example, a solid state disk (solid state disk, SSD)) etc.

Those skilled in the art can understand that the various digital numbers such as first and second involved in the present application are only for easy distinction for description, and are not used to limit the scope of the embodiments of the present application, but also indicate a sequence.

At least one in this application can also be described as one or more, and the multiple can be two, three, four or more, which is not limited in this application. In the embodiments of this application, for a technical feature, the technical feature is distinguished by "first", "second", "third", "A", "B", "C", and "D", etc. For the technical features in "First", "Second", "Third", "A", "B", "C" and "D", there is no order or size order among the technical features.

The corresponding relationships shown in the tables in this application can be configured or pre-defined. The value of the information in each table is only an example, and can be configured to other values, which is not limited in this application. When configuring the correspondence between the information and the parameters, it is not necessarily required to configure all the correspondences indicated in the tables. For example, in the table in this application, the corresponding relationship shown in some rows may not be configured. For another example, appropriate deformation adjustments can be made based on the above table, such as splitting, merging, and so on. The names of the parameters shown in the titles in the above tables may also adopt other names that can be understood by the communication device, and the values or expressions of the parameters may also be other values or expressions that can be understood by the communication device. When the above tables are implemented, other data structures can also be used, such as arrays, queues, containers, stacks, linear tables, pointers, linked lists, trees, graphs, structures, classes, heaps, hash tables, or hash tables.

The pre-definition in this application can be understood as definition, pre-definition, storage, pre-storage, pre-negotiation, pre-configuration, curing, or pre-fired.

Those skilled in the art may be aware that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of this application.

Those skilled in the art can clearly understand that, for the convenience and conciseness of description, the specific working process of the above-described system, device, and unit can refer to the corresponding process in the foregoing method embodiment, which will not be repeated here.

The above are only specific implementations of this application, but the protection scope of this application is not limited to this. Any person skilled in the art can easily think of changes or substitutions within the technical scope disclosed in this application. Should be covered within the scope of protection of this application. Therefore, the protection scope of this application should be subject to the protection scope of the claims.

What is claimed is:

1. A method for detecting a traffic anomaly of Internet of Things (IoT) device based on automata, comprising:
    collecting normal traffic of an IoT device to be monitored in each working state, and deriving normal traffic traces;
    generating flow trees by assembling each flow in the normal traffic traces, and generating joint flow trees by merging the flow trees; and
    converting a data structure representing the flow in the joint flow trees into automata models after performing reduction processing on the flow in the joint flow trees.

2. The method of claim 1, wherein generating the flow trees by assembling each flow in the normal traffic traces comprises:
    obtaining an identifier of the flow, and marking the identifier of the flow at a root node of a flow tree;
    obtaining a 2-tuple of length and direction of a communication packet in the flow, and marking the 2-tuple at a non-root node of the flow tree; and
    marking an occurrence number of two consecutive packets in a same context on an edge of the flow tree, and combining same prefix sequences in the flow into a same node representation, so as to generate the flow trees.

3. The method of claim 1, wherein generating the joint flow trees by merging the flow trees comprises:
    calculating a similarity measure between different flow trees; and
    generating the joint flow trees by merging two flow trees corresponding to a similarity metric value smaller than a preset threshold.

4. The method of claim 1, wherein performing the reduction processing on the flow in the joint flow trees comprises:
    obtaining a first class of flow tree with a node packet ratio exceeding a preset threshold from the joint flow trees; wherein, the node packet of each flow tree is calculated by dividing a number of nodes in the joint flow trees by a number of packets with different tuples of length and direction represented by each node; and
    converting the first class of flow tree into a packet sequence diagram; wherein, in the packet sequence diagram, a root node of the first class of flow tree and a flow identifier in a node are reserved, packets with a same tuple of length and direction are represented by a same node, and a directed edge is added between every pair of nodes corresponding to two consecutive packets.

5. The method of claim 1, wherein performing the reduction processing on the flow in the joint flow trees comprises:
    obtaining, from the joint flow trees, a second class of flow tree that a number of packets with different tuples of length and direction is greater than a preset threshold; and
    determining a packet with a proportion of packets with different tuples of length and direction being greater than a preset threshold as a beacon packet, representing the beacon packet by a single vertex, determining a context of another node according to a beacon packet that is closest to the node in a packet sequence, aggregating packets with a same direction but different lengths into a same kind of packets and representing the same kind of packets by a node that represents a packet collection with a certain length within a certain range and a specific direction, and organizing the joint flow trees into a packet sequence diagram.

6. The method of claim 1, wherein converting the data structure representing the flow in the joint flow trees into the automata models comprises:
    converting all nodes in the joint flow trees into a state set, wherein a node marked with a flow identifier is an initial state of the automata model, and packet tuples in different forms on the node forms a symbol set of the automata;
    for every two nodes connected by a directed edge in an original data structure, adding a state transition relationship between a state corresponding to a predecessor node and a state corresponding to a symbol of a successor node mapped to the successor node to a state transition function; and forming an acceptance state set of the automata models by marking a state corresponding to the last packet appearing in the original communication flow as an acceptance state.

7. The method of claim 1, wherein after obtaining the automata models, the method further comprises:
obtaining a traffic to be detected of the IoT device; and
determining that the flow to be detected is abnormal in response to no automata model matching to the flow to be detected.

8. The method of claim 1, wherein after obtaining the automata models, the method further comprises:
generating a corresponding abstract event in response to receiving the flow by the IoT device; and
determining that the flow is abnormal in response to absence of two successive abstract events in the normal traffic traces.

9. The method of claim 7, further comprising:
sending an alarm packet in response to determining an anomaly.

10. An apparatus for detecting a traffic anomaly of Internet of Things (IoT) device based on automata, comprising:
a processor; and
a memory storing instructions executable by the processor,
wherein the processor is configured to:
collect normal traffic of an IoT device to be monitored in each working state, and generate normal traffic traces;
generate flow trees by assembling each flow in the normal traffic traces, and generate joint flow trees by merging the flow trees; and
convert a data structure representing the flow in the joint flow trees into automata models after performing reduction processing on the flow in the joint flow trees.

11. A non-transitory computer-readable storage medium, having instructions stored thereon, wherein when the instructions are executed by a processor, the processor is caused to implement a method for detecting a traffic anomaly of Internet of Things (IoT) device based on automata, comprising:
collecting normal traffic of an IoT device to be monitored in each working state, and deriving normal traffic traces;
generating flow trees by assembling each flow in the normal traffic traces, and generating joint flow trees by merging the flow trees; and
converting a data structure representing the flow in the joint flow trees into automata models after performing reduction processing on the flow in the joint flow trees.

* * * * *